United States Patent
Hulsman et al.

(10) Patent No.: US 10,913,531 B2
(45) Date of Patent: Feb. 9, 2021

(54) AIRCRAFT WITH WING-BORNE FLIGHT MODE AND HOVER FLIGHT MODE

(71) Applicant: ATMOS UAV B.V., Delft (NL)

(72) Inventors: Sander Hulsman, Amsterdam (NL); Jurjen De Groot, Delft (NL); Maarten Milis, Delft (NL); Dirk Lucas Eduard Dokter, Delft (NL); Joost Leon Bouman, Delft (NL); Ruud Knoops, Delft (NL)

(73) Assignee: ATMOS DAV B.V., Delft (NL)

( * ) Notice: Subject to any disclaimer, the term of this patent is extended or adjusted under 35 U.S.C. 154(b) by 292 days.

(21) Appl. No.: 15/328,611

(22) PCT Filed: Jul. 21, 2015

(86) PCT No.: PCT/NL2015/050531
§ 371 (c)(1),
(2) Date: Jan. 24, 2017

(87) PCT Pub. No.: WO2016/013933
PCT Pub. Date: Jan. 28, 2016

(65) Prior Publication Data
US 2017/0217585 A1    Aug. 3, 2017

(30) Foreign Application Priority Data

Jul. 24, 2014  (NL) ...................... 2013252

(51) Int. Cl.
*B64C 29/02*  (2006.01)
*B64C 39/02*  (2006.01)

(52) U.S. Cl.
CPC ............ *B64C 29/02* (2013.01); *B64C 39/024* (2013.01); *B64C 2201/028* (2013.01);
(Continued)

(58) Field of Classification Search
CPC ... B64C 29/02; B64C 29/0033; B64C 39/024; B64C 2201/108; B64C 2201/165;
(Continued)

(56) References Cited

U.S. PATENT DOCUMENTS 3,181,810 A * 5/1965 Olson ................. B64C 29/0033
                                              244/66
3,284,027 A * 11/1966 Marc ................... B64C 29/0033
                                              244/12.4
(Continued)

FOREIGN PATENT DOCUMENTS

WO    2013048339 A1    4/2013

OTHER PUBLICATIONS

Hulsman et al., "08 Leonardo Times", http://repository.tudelft.nl/assets/uuid:fe12e184-a52f-4da8-84eb-18f3dcba4lla/Atmos.pdf (Mar. 2013).
(Continued)

*Primary Examiner* — Medhat Badawi
*Assistant Examiner* — Vicente Rodriguez
(74) *Attorney, Agent, or Firm* — Browdy and Neimark, P.L.L.C.

(57) ABSTRACT

An aircraft, in particular an unmanned aerial vehicle with wing-borne flight mode and hover flight mode, comprises a wing structure (4) having a left (6), middle (7), and right wing section (8). A support structure extends from the wing structure (4), and has an upper and lower support section. Each one of the left and right wing section (6, 8), and upper and lower support section (18, 20) has a thrust unit (10, 12, 22, 24). Left and right wingtip sections are rotatable relative to a left and right wing base section, respectively, around an axis extending substantially in a lengthwise direction of the wing structure. The thrust units (10,12) of the left and right
(Continued)

wing sections(6, 8) are provided at the respective wingtip sections, in particular at the extremities thereof.

24 Claims, 7 Drawing Sheets (52) U.S. Cl.
CPC .. *B64C 2201/042* (2013.01); *B64C 2201/088* (2013.01); *B64C 2201/104* (2013.01); *B64C 2201/108* (2013.01); *B64C 2201/165* (2013.01)

(58) Field of Classification Search
CPC .......... B64C 2201/88; B64C 2201/042; B64C 2201/028; B64C 27/00
See application file for complete search history.

(56) References Cited

U.S. PATENT DOCUMENTS

| | | | | |
|---|---|---|---|---|
| 4,415,133 A | * | 11/1983 | Phillips | B64C 31/00 244/53 R |
| 8,136,766 B2 | * | 3/2012 | Dennis | B64C 3/38 244/199.4 |
| 8,434,710 B2 | * | 5/2013 | Hothi | B64C 39/024 244/17.23 |
| 8,602,348 B2 | * | 12/2013 | Bryant | B64C 29/0033 244/12.4 |
| 2005/0178879 A1 | * | 8/2005 | Mao | B64C 29/02 244/7 B |
| 2005/0230519 A1 | * | 10/2005 | Hurley | B64C 29/0033 244/7 C |
| 2014/0217229 A1 | * | 8/2014 | Chan | B64C 29/02 244/6 |
| 2015/0266571 A1 | * | 9/2015 | Bevirt | B64D 27/24 244/7 C |
| 2015/0274289 A1 | * | 10/2015 | Newman | B64C 27/26 244/12.4 |

OTHER PUBLICATIONS

Menno Hochstenbach et al.,"Design and control of an unmanned aerial vehicle for autonomous parcel delivery with transition from vertical take-off to forward flight—VertiKUL, a quadcopter tailsitter" (Jan. 2013).

Stoll et al.,"A Multifunctional Rotor Concept for Quiet and Efficient VTOL Aircraft", 2013 Aviation Technology, Integration, and Operations Conference, pp. 2-3, (Aug. 2013).

* cited by examiner

AIRCRAFT WITH WING-BORNE FLIGHT MODE AND HOVER FLIGHT MODE

FIELD OF THE INVENTION

The invention relates to the field of aircrafts, and more specifically to the field of unmanned aerial vehicles, UAVs. In particular, the invention relates to an UAV having a wing-borne flight mode and a hover flight mode.

BACKGROUND OF THE INVENTION

Unmanned aerial vehicles which can both move in the air using the aerodynamic properties of a pair of wings and remain in one position in the air using vertical thrust, are known in the art.

Reference WO 2013/048339 A1 discloses an UAV capable of vertical and horizontal flight modes. The UAV comprises a wing structure comprising elongated equal first and second wings, and a support structure comprising first and second sections coupled to a middle position of the wing structure and extending in opposite directions perpendicular to the wing structure. Four propellers are mounted to respective ones of the first and second wings and the first and second sections at at least one of the respective leading edges or trailing edges thereof, for powering the UAV in its vertical and horizontal flight modes. The propellers on the first and second wings are mounted near the fuselage. Rotational speeds of the respective propellers may be independently controlled, wherein the propellers mounted to the first and second wings are configured to rotate in a first direction, while the propellers mounted to the first and second sections are configured to rotate in a second direction opposite to the first direction. The UAV comprise a fuselage partially integrated with the wing structure at the middle point of the wing structure.

Reference U.S. 2005/0178879 A1 discloses a tail sitter vertical take-off and landing, VTOL, aircraft with two pairs of propellers mounted respectively at the ends of a left wing, a right wing, a top vertical tail stabilizer and a bottom vertical tail stabilizer. The wing propellers and tail propellers spin in opposite directions. Full attitude control is realized in all flight phases through differential powering of the four propellers coordinated by an electronic control system. Four propellers together generate sufficient thrust to counter gravity in hover mode, while the wings provide aerodynamic lift for efficient forward flight. In horizontal forward flight, the top and bottom propellers can be stopped and folded up.

The aircrafts constructed in accordance with said references have limited flight characteristics due to the fact that, for a change of flight direction, or yaw or pitch control, they rely on a differential thrust between the thrust units of the first and second wings, or left and right wings, respectively, on the one hand, and between the thrust units of the first and second sections, or top and bottom stabilizers, respectively, on the other hand. Accordingly, a change of flight direction will take relatively much time and much energy, may cause a loss of height and/or speed. Maneuverability of the aircraft of said references is limited.

The UAVs of said references further suffer from limited possibilities for roll control in wing-borne flight.

SUMMARY OF THE INVENTION

It would be desirable to provide an aircraft, in particular an unmanned aerial vehicle, having improved maneuverability. It would also be desirable to provide such aircraft being more (energy) efficient.

To better address one or more of these concerns, in a first aspect of the invention an aircraft, in particular an unmanned aerial vehicle, is provided. The aircraft can be operated in wing-borne flight mode wherein the aircraft has a horizontal air speed to generate aerodynamic lift through the wing having an aerodynamic profile. The aircraft can further be operated in hover flight mode to be hovering in the air, where the horizontal air speed is low or zero, lift is generated by thrust units on the aircraft, and the wing does not generate lift. Controlled continuous flight at any state in between hover flight mode and wing-borne flight mode is also possible.

The aircraft of the invention comprises a wing structure having a lengthwise direction, and having a left wing section and a right wing section, and a support structure extending from, e.g. perpendicular to, the wing structure, and having an upper support section and a lower support section. Each one of the left wing section, the right wing section, the upper support section and the lower support section is provided with a thrust unit, i.e. a unit configured to generate a thrust relative to air in a predetermined direction. The thrust is variable and controllable, and the thrust generated in operation by one thrust unit may be different from the thrust generated by any of the other thrust units. In the wing structure, the left wing section comprises a left wing base section and a left wingtip section, wherein the left wingtip section is rotatable relative to the left wing base section around an axis extending substantially in the lengthwise direction of the wing structure. The right wing section comprises a right wing base section and a right wingtip section, wherein the right wingtip section is rotatable relative to the right wing base section around an axis extending substantially in the lengthwise direction of the wing structure. The thrust unit of the left wing section is provided at the left wingtip section, and the thrust unit of the right wing section is provided at the right wingtip section.

Figure 11A:
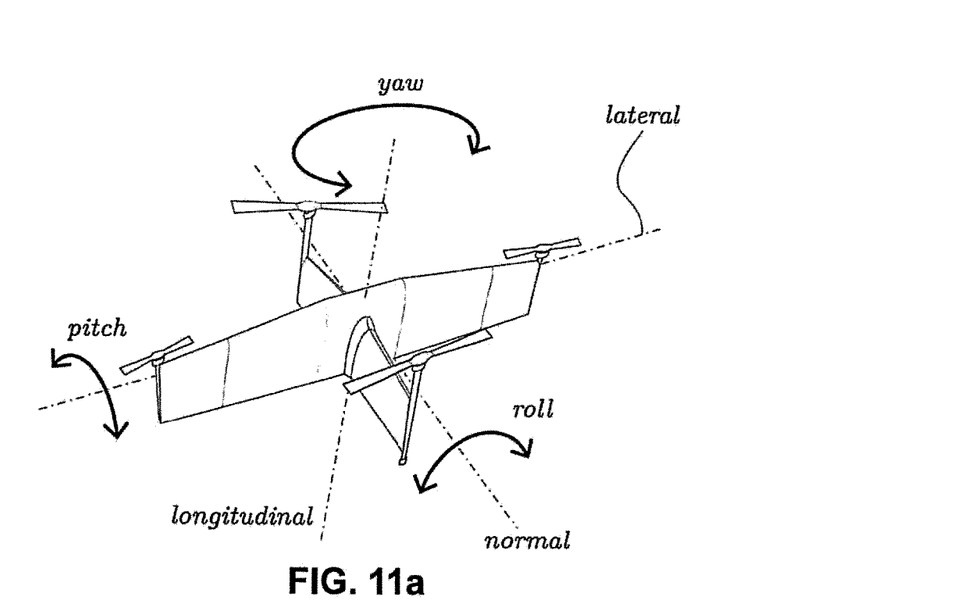
FIGS. 11a and 11b illustrate definitions of axes and motions of the aircraft in hover flight mode and wing-borne flight mode, respectively.
Figure 11B:
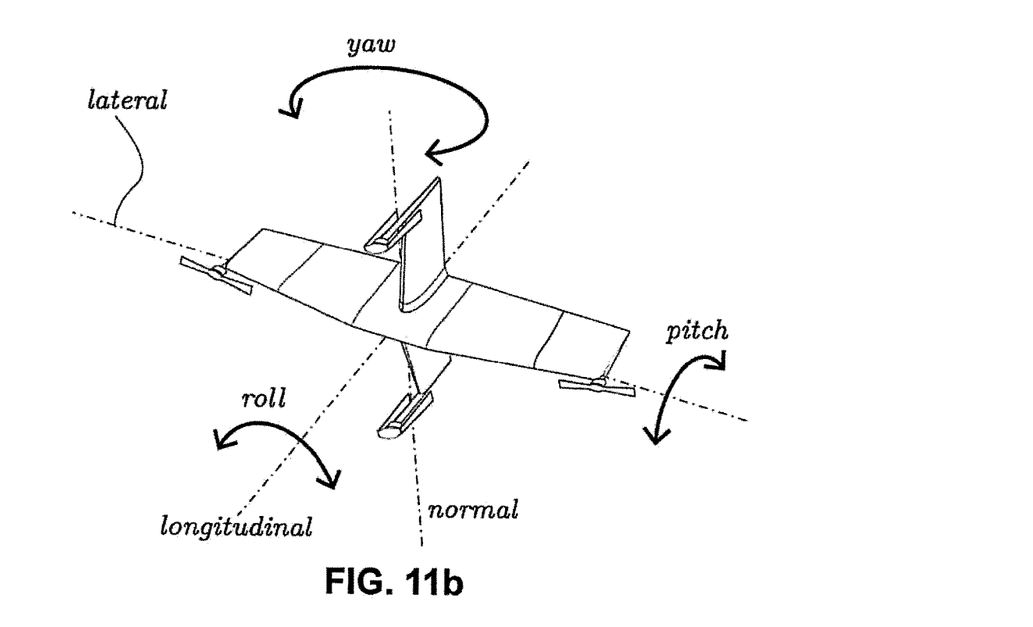

Herein, the terms "left", "right", "upper" and "lower" are not to be taken absolute, and merely are used to spatially indicate different structural elements of the aircraft when seen in wing-borne flight mode flying with the wing structure extending horizontally. Further, "horizontal" is defined as perpendicular to the local gravity vector, whereas "vertical" is defined as parallel to the local gravity vector. Further, "perpendicular" is to be taken as "essentially at right angles to", i.e. at an angle in a range of 80° to 100°. Further, conventions used to define pitch, roll and yaw, as well as "longitudinal", "lateral" and "normal" directions, are shown in FIG. 11a (hover flight mode) and FIG. 11b (wing-borne flight mode). Thus, e.g. the lengthwise direction of the wing structure can also be indicated as the "lateral" direction of the aircraft. It is further noted that each one of the left wing section, the right wing section, the upper support section and the lower support section comprises at least one thrust unit, and may comprise more than one thrust unit.

In the aircraft of the invention, the rotatable left and right wingtip sections provide greatly improved maneuverability, in particular roll control in wing-borne flight mode and yaw control in hover flight mode. The leading edges of the left and right wingtip sections may be rotated in opposite directions such as, taken from a horizontal neutral position, left upwards and right downwards, or right upwards and left downwards, to easily allow roll control in wing-borne flight mode. In hover flight mode of the aircraft, this allows the aircraft to be rotated about a vertical axis for yaw control.

Also, pitch control of the aircraft in wing-borne flight mode may be improved, wherein e.g. the leading edges of the left and right wingtip sections may both be rotated in the same direction such as, taken from a horizontal neutral position, upwards or downwards, to allow for sharper pitch movements in wing-borne flight mode when compared to the aircrafts according to the references above. In hover flight mode, thus horizontal movements are possible without transfer to a wing-borne flight mode.

Furthermore, the leading edge of only one of the left and right wingtip sections may be rotated from a neutral position, while the other one of the left and right wingtip sections remains in a neutral position. Still further, a rotation amount of the left wingtip section may differ from a rotation amount of the right wingtip section.

The thrust units of the left and right wingtip sections rotate along together with the left and right wingtip sections to thereby enhance the effect that such rotation is intended to have.

The support sections of the support structure, having a symmetric aerodynamic profile, are configured to carry their thrust units with main objects to cause sufficient strength to convey the generated forces to the wing structure, and to cause minimal drag in wing-borne flight mode, and furthermore may provide a (yaw) stabilizing effect in wing-borne flight mode.

In an embodiment of the aircraft, the thrust unit of the left wing section is provided at an extremity of the left wingtip section, and wherein the thrust unit of the right wing section is provided at an extremity of the right wingtip section.

An advantage of having the thrust units of the left and right wing sections provided at the extremities of the corresponding wingtip sections, i.e. at the greatest possible distance from each other, is that the moments, such as the rolling moments, generated by the thrust units are maximum, whereby a more efficient flight is possible, since the thrust power to be generated for a particular maneuver is relatively low. Particular maneuvers include yaw and roll control in hover flight mode, and changes in flight direction in wing-borne flight mode. A roll moment which is generated, such as in hover flight mode, can be relatively high, whereby a change in thrust to be generated in roll control is relatively low.

A further advantage of having the thrust units of the left and right wing sections provided at the extremities of the corresponding wingtip sections is that, in wing-borne flight mode, wing tip vortices may be suppressed most effectively. The acceleration of air in tangential direction by the propeller induces a rotational motion on the propeller wake (i.e., an air stream tube formed by the propeller in operation, downstream of the propeller). If the direction of rotation is set correctly, this swirl effect can be used to counteract the wing tip vortices, that appear at the extremities of any lifting body as a result of the pressure difference below and above the body. Wing tip vortices are responsible for a significant component of the total drag on the aircraft, called the induced drag. Reduction of said vortices thus reduces induced drag and leads to more efficient flight. This effect is strongest when the propeller axis is located at the extremity of the wingtip section.

It is noted that other positions of thrust units on the left and right wingtip sections, i.e. not at the extremities of the wingtip sections, may be selected, to fulfill other requirements on the aircraft better, or for other reasons. In view of the aerodynamic circumstances at the part of the wing section wetted by the propeller wake, the position of the thrust unit preferably is selected such that the distance between, on the one hand, the interface between the (left or right) wing base section and the (left or right, respectively) wingtip section and, on the other hand, the thrust unit (i.e., an axis of rotation of the propeller thereof) is larger than the length of the propeller blade.

For a sufficient maneuverability of the aircraft, the left and right wingtip sections are rotatable relative to the respective left and right wing base sections within a rotation angle range of about +50° to about −50°, in particular a rotation angle range of about +30° to about −30°, more in particular a rotation angle range of about +25° to about −25°. Here, the rotation angle range is defined relative to a neutral angle of rotation of 0°, in which the wingtip section lies flush with the wing base section in the left and right wing sections. Limiting the rotation angle range provides an advantage of reduced wear of cables and/or ducts that may be needed to supply power and control signaling through the left and right wing sections to the thrust units, which cables and/or ducts may run through a hollow shaft forming an axis of rotation between a wing base section and the corresponding wingtip section, and are deformed, such as twisted, every time a rotation angle changes. With a limitation of rotation angle range, these deformations are limited to result in less wear and less chances of breakage of components of the cable.

In an embodiment of the aircraft, a length of the left and right wingtip sections is smaller than 60% of the length of the respective left and right wing section, and larger than the propeller blade length.

In case the length of a wingtip section (as seen in lateral direction) would be larger than 60% of the length of the corresponding wing section, unfavorable aircraft designs result. Therefore, lower relative lengths are desirable, with a lower limit of the propeller blade length. In the latter case, a preferred position of the thrust unit is at an extremity of the wingtip section, as explained above.

In an embodiment of the aircraft, the thrust units of the respective upper and lower support sections are provided on an extremity thereof to provide optimum pitch control in hover flight mode by varying the generated thrust of one or both thrust units.

In an embodiment of the aircraft, each thrust unit comprises a propeller coupled to an electric motor.

Herein, when using the term "propeller", also impellers are considered to be covered by this term. Each propeller can have two, or more than two blades extending from an axis of rotation of the propeller.

An advantage of a propeller driven by an electric motor is that the thrust generated by the propeller can be varied over a large range by controlling the motor electronically with a very high efficiency, accuracy and low response time.

In an embodiment of the aircraft, the propellers, in particular the blades of the propellers, of the thrust units of the upper and lower support sections are collapsible.

An advantage of the collapsible propellers is that when they are not needed to provide thrust during wing-borne flight mode, a drag caused by the non-rotating propellers is at a minimum. The blades of a propeller may collapse by tilting to a position parallel to the axis of rotation of the propeller. The tilting may be backwards, with free ends of the blades pointing opposite to a direction of flight of the aircraft, or may be forward, with the free ends of the blades of the propeller pointing in the direction of flight of the aircraft. Alternatively, a blade of a propeller may also be tilted about an axis parallel to the lengthwise dimension of the propeller blade, thereby changing a pitch angle of the blade, such that the projected area of the blade geometry blocking the airflow is minimized.

In an embodiment of the aircraft, the thrust units of the respective upper and lower support sections each are mounted on a support, such as a rod or bar, extending from the respective upper and lower support sections, e.g. at the extremities thereof.

An advantage of providing rods or bars, which extend along a vector of thrust generated by the thrust units, is that in case the thrust units comprise collapsible propellers, the (blades of the) propellers may collapse along a rod or bar without risk of coming into contact with the corresponding support section, even while the propellers would still be rotating in a collapsed state.

In an embodiment of the aircraft, the blades of the propellers of the thrust units of the upper and lower support sections are longer than the blades of the propellers of the thrust units of the left and right wing sections.

An advantage of the longer blades of the propellers of the thrust units of the upper and lower support sections is that they can provide a high thrust in an efficient manner when the aircraft is in hover flight mode, to carry the majority of the aircraft weight, when there is no aerodynamic lift generated by the wing.

In an embodiment of the aircraft, a pitch angle of the (blades of the) propellers of the thrust units of the upper and lower support sections is smaller than a pitch angle of the propellers of the thrust units of the left and right wing sections.

An advantage of the smaller pitch angle of the propellers of the thrust units of the upper and lower support sections is that their performance in hover mode, when they are normally used, is best.

In an embodiment of the aircraft, pairs of propellers of the thrust units of the left and right wing sections are configured to be rotated in opposite directions, and/or wherein pairs of propellers of the thrust units of the support structure are configured to be rotated in opposite directions, to compensate rolling moments induced by the rotation of the propellers. The direction of rotation of the propellers of the left and right wing sections is selected such that wing tip vortices are suppressed.

An advantage of the pairs of counter-rotating propellers of the wing structure and the support structure, respectively, is that for each pair of counter-rotating propellers the generated torques are generally balanced in a stable flight mode. In case of a plurality of thrust units of the upper and lower support sections, it will be clear that the propellers of a pair of these thrust units are to be counter-rotating, whether this pair consists of propellers of two thrust units of upper support sections, propellers of two thrust units of lower support sections, or one propeller of a thrust unit of an upper support section and one propeller of a thrust unit of a lower support section.

In an embodiment of the aircraft, each one of the left and right wing sections is detachably coupled to a middle wing section by a coupling.

Providing a coupling allows for disassembling the aircraft, which makes transport of the aircraft easier when it is not in operation. Also repair and/or modification of the aircraft may be easier when the repair and/or modification concerns only a part of the aircraft.

In an embodiment of the aircraft, the coupling comprises at least one rod in one part of the coupling configured to engage a corresponding hole in another part of the coupling.

The rod, which may e.g. be made of metal, plastic, such as fiber-reinforced plastic, wood or ceramics, aligns the parts of the coupling (and thereby aligns the aircraft components that are coupled), and particularly allows the coupling to absorb shearing and bending forces.

In an embodiment of the aircraft, the rod is configured to break when a predetermined bending stress exerted thereon is exceeded. In case the aircraft would crash, the aircraft may be subject to considerable stresses when it comes into contact with the ground or other objects. With a breaking of the rod, a left or right wing section may be released from the middle wing section to absorb impact energy and limit damage due to a crash. The location of breaking of the rod may be predetermined by providing a weakened section in the rod, e.g. by locating the weakened section such that, in use, it is situated at or near the interface between the middle wing section and the left or right wing section.

In an embodiment of the aircraft, the coupling comprises an electrical and/or optical and/or pneumatic and/or hydraulic connector, which allows for easy and complete release of one aircraft component from the other, while ensuring transfer of electrical, pneumatic and/or hydraulic power and/or signals when the components are coupled.

In an embodiment of the aircraft, the coupling comprises a magnetic coupling, which provides attracting forces to hold one aircraft component against another. The magnetic coupling may comprise a permanent magnet in one part of the coupling, and another permanent magnet in another part of the coupling. Alternatively, the magnetic coupling may comprise a permanent magnet in one part of the coupling, and a magnetizable material in another part of the coupling, wherein the permanent magnet attracts the magnetizable material.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
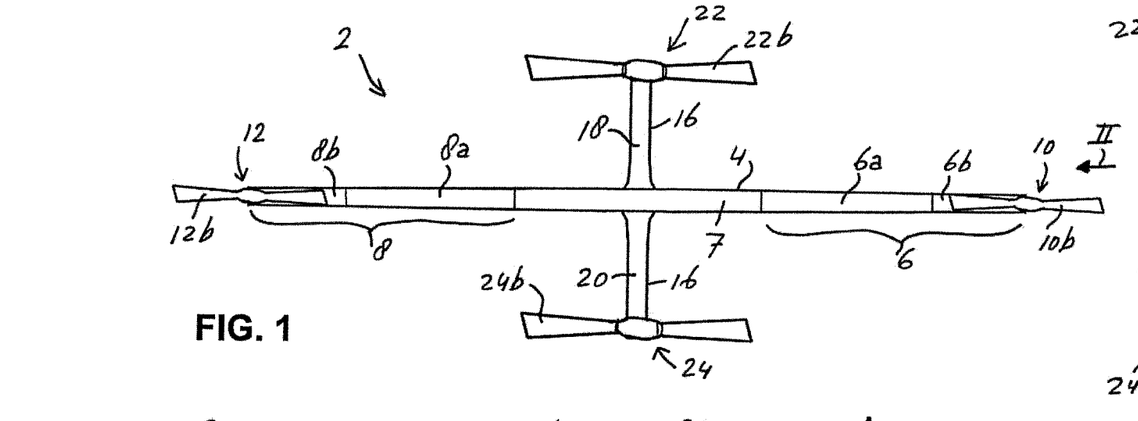
FIG. 1 depicts a schematic front view of an embodiment of the aircraft of the present invention.
Figure 2:
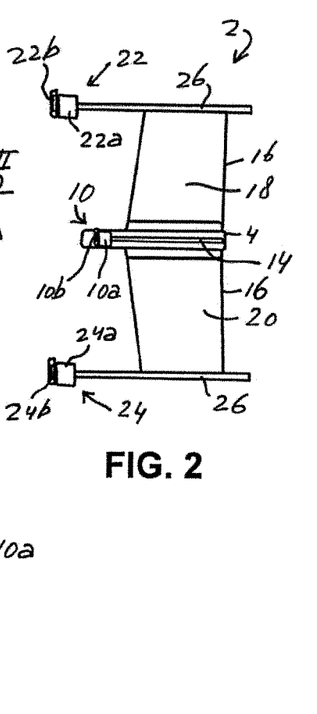
FIG. 2 depicts a side view of the aircraft of FIG. 1, as seen in the direction indicated by arrow II in FIG. 1.
Figure 3:
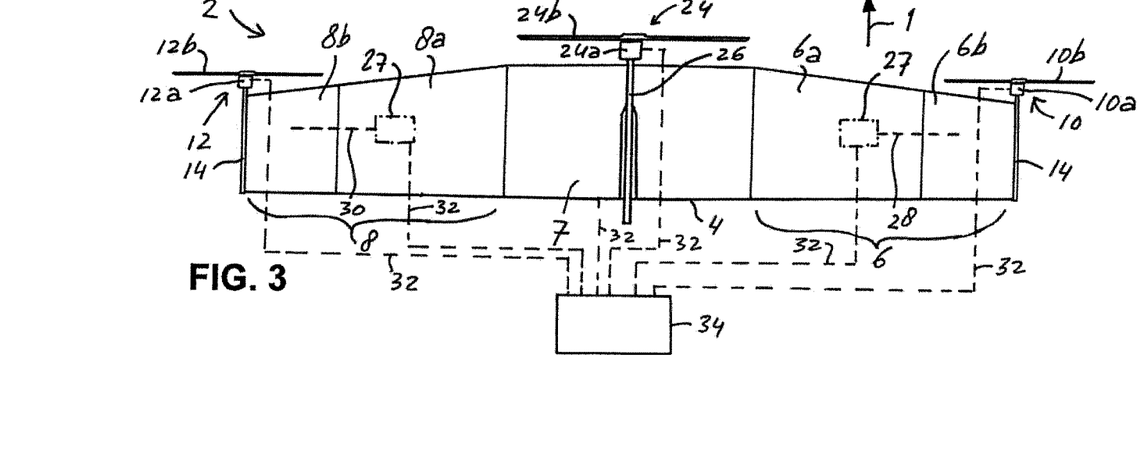
FIG. 3 depicts a bottom view of the aircraft of FIG. 1.

FIGS. 1 to 3 depict an aircraft 2 which is configured to fly in a wing-borne flight mode in a flight direction of arrow 1 (FIG. 3) and in a hover flight mode. In particular, the aircraft 2 is an unmanned aerial vehicle.

An elongated wing structure 4 comprises a left wing section 6, a middle wing section 7, and a right wing section 8. All of the wing sections 6, 7 and 8 are configured to provide aerodynamic lift in wing-borne flight mode of the aircraft 2. The left and right wing sections 6, 8 each carrying a thrust unit 10, 12, respectively, comprising an electric motor 10a, 12a, respectively, and a propeller 10b, 12b, respectively. The thrust units 10, 12 are provided at the extremities of the wing sections 6, 8, respectively, and may each be mounted on a rod 14, bar, or other support structure.

A support structure 16 comprises an upper support section 18 and a lower support section 20, each carrying a thrust unit 22, 24, respectively, comprising an electric motor 22a, 24a, respectively, and a propeller 22b, 24b, respectively. The thrust units 22, 24 are provided at the extremities of the support sections 18, 20, respectively, and may each be mounted on a rod 26, bar, or other support.

The (blades of the) propellers 10b, 12b are shorter than the propellers 22b, 24b. The pitch angle of the (blades of the) propellers 10b, 12b is greater than the pitch angle of the (blades of the) propellers 22b, 24b.

The left wing section 6 comprises a left wing base section 6a and a left wingtip section 6b rotatably connected to the left wing base section 6a. Rotation of the left wingtip section 6b relative to the left wing base section 6a is around an axis of rotation, which is indicated by dashed line 28. The axis of rotation 28 generally extends in a lengthwise direction of the wing structure 4.

The right wing section 8 comprises a right wing base section 8a and a right wingtip section 8b rotatably connected to the right wing base section 8a. Rotation of the right wingtip section 8b relative to the right wing base section 8a is around an axis of rotation, which is indicated by dashed line 30. The axis of rotation 30 generally extends in a lengthwise direction of wing structure 4.

The thrust units 10, 12 are connected to the respective left and right wingtip sections 6b, 8b at the extremities thereof, and rotate together with the left and right wingtip sections 6b, 8b. An actuator 27 driving the rotation of the wingtip sections 6b, 8b around the axes 28, 30 is schematically indicated in the left and right wing sections 6, 8 as a dash-dotted box to be in one of, or in both of the wing base sections 6a, 8a and wingtip sections 6b, 8b. The actuator 27 may be an electric, pneumatic or hydraulic motor, in particular a servo motor, or any other appropriate actuator.

As indicated by dashed lines 32, the motors 10a, 12a, 22a, 24a and the wingtip section actuators 27 may be supplied with power and controlled from a central supply and control unit 34. Electric power and control signals may be fed to the motor and wingtip section actuators through cables accommodated in the wing structure 4 and support structure 16. In the wing structure 4, at the interface between the left wing base section 6a and the left wingtip section 6b, and at the interface between the right wing base section 8a and the right wingtip section 8b, such cables may be accommodated in hollow tubes forming the axes of rotation 28, 30, respectively.

Figure 4:
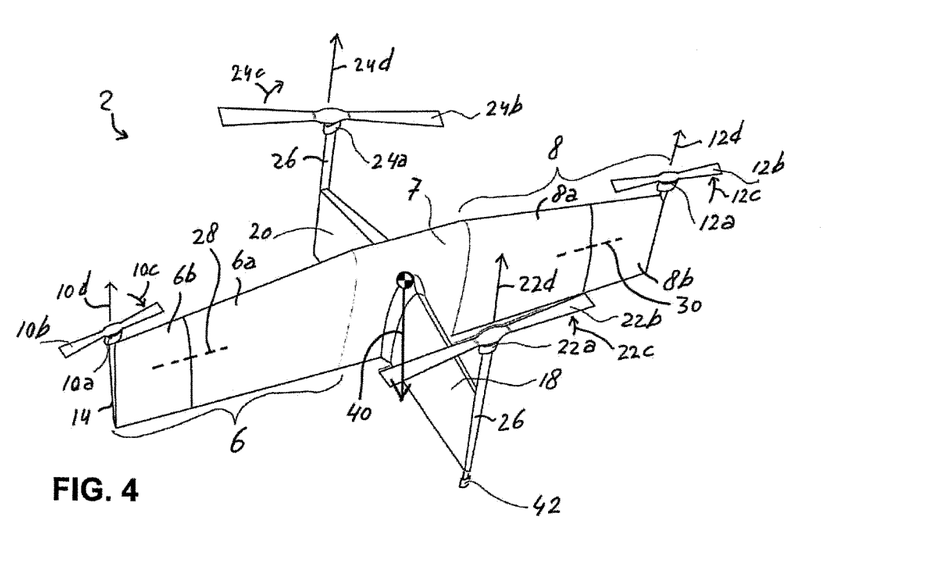
FIG. 4 depicts a schematic perspective view of an embodiment of the aircraft of the present invention in hover flight mode.

FIG. 4 shows the aircraft 2 in hover flight mode, with the force of gravity acting on the aircraft 2 as indicated by arrow 40. In the hover flight mode, motors 10a, 12a, 22a and 24a operate to drive the respective propellers 10b, 12b, 22b and 24b in directions of rotation as indicated by respective arrows 10c, 12c, 22c and 24c to provide thrust in directions as indicated by respective arrows 10d, 12d, 22d and 24d. Propellers 10b and 12b are counter-rotating to balance torques generated thereby. For the same reason, propellers 22b and 24b are counter-rotating. The larger part of the total thrust required in the hover flight mode is produced by the propellers 22b, 24b by virtue of their relatively large length and relatively low pitch angle.

Figure 6:
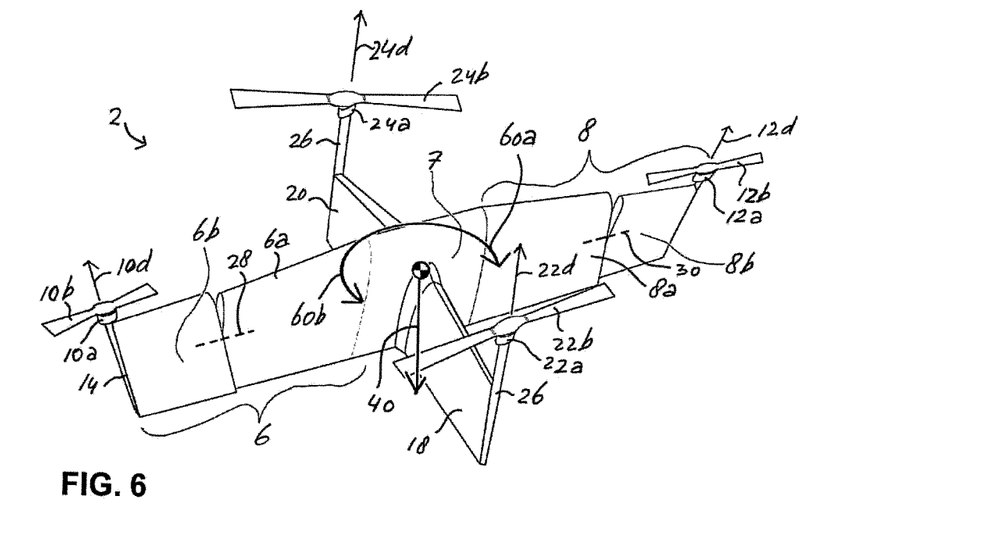
FIG. 6 depicts a variant of the perspective view of FIG. 4 to illustrate yaw control in hover flight mode.

As illustrated in FIG. 6, yaw control of the aircraft 2 in hover flight mode, i.e. control of aircraft movement in one of the directions 60a and 60b as indicated by a double arrow, can be performed by rotating the left wingtip section 6b relative to the left wing base section 6a across a desired angle (relative to the neutral angular position as illustrated in FIG. 4) about axis 28. At the same time, the right wingtip section 8b can be rotated relative to the right wing base section 8a across an angle (relative to the neutral angular position as illustrated in FIG. 4) about axis 30 in opposite direction to the left wingtip section angle to generate a moment of yaw in the same direction. In the situation as illustrated in FIG. 6, the moment of yaw will be in direction of arrow 60a.

It is noted that a similar moment of yaw would be generated when only one of the left wingtip section 6b and right wingtip section 8b would be rotated relative to the corresponding wing base section, and the other one of the left wingtip section 6b and right wingtip section 8b would be in its neutral position.

It is further noted that horizontal movements (i.e. movements having a horizontal component) of the aircraft 2 in hover flight mode can be induced by rotating both the left wingtip section 6b and right wingtip section 8b in the same direction, by differential thrust wherein propeller 10b produces a thrust different from propeller 12b, and/or by differential thrust wherein propeller 22b produces a thrust different from propeller 24b. Which one of these options, or which combination of options is chosen, may depend from the nature of the horizontal movement (desired direction, desired speed), energy consumption, etc.

For starting and landing purposes, the aircraft 2 is in the hover flight mode. To detect contact of the aircraft with the ground, at least one sensor 42 (FIG. 4) may be provided, such as a pressure sensor or a proximity sensor.

Figure 5:
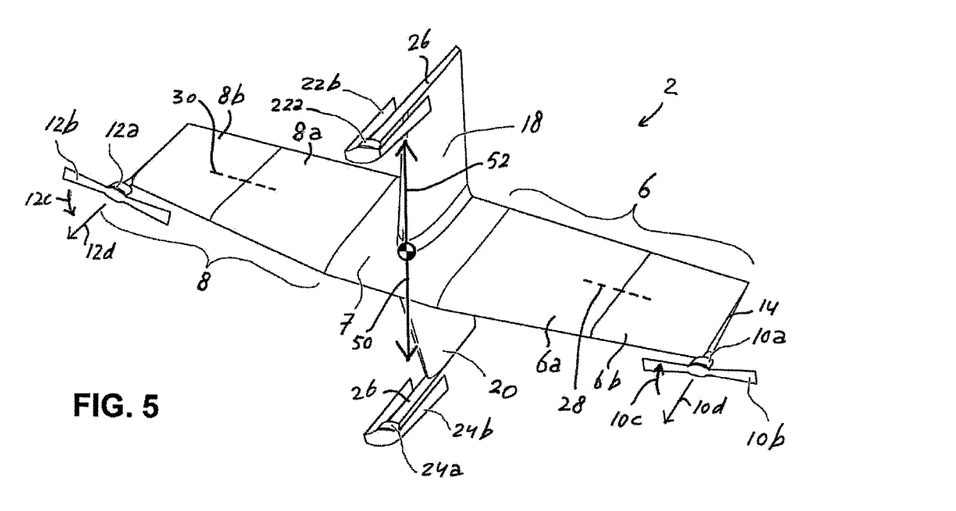
FIG. 5 depicts a perspective view of the aircraft of FIG. 4 in wing-borne flight mode.

FIG. 5 shows the aircraft 2 in wing-borne flight mode, with the force of gravity acting on the aircraft 2 as indicated by arrow 50, and with a force of lift generated by the wing structure 4 as indicated by arrow 52. In the wing-borne flight mode, motors 10a and 12a operate to drive the respective propellers 10b and 12b in directions of rotation as indicated by the respective arrows 10c and 12c to provide thrust in the directions as indicated by respective arrows 10d and 12d. Propellers 10b and 12b are counter-rotating to balance torques generated thereby.

Generally, in stable wing-borne flight mode, the propellers 22b, 24b are not operated to provide thrust. To minimize drag generated by the non-operating propellers 22b, 24b, the blades thereof are folded back, as is explained in more detail by reference to FIGS. 9 and 10 below. With the motors 22a, 24a mounted on the rods 26, it can be ensured the blades of the propellers 22b, 24b do not interfere with the upper support section 18 and the lower support section 20, respectively, when the part of the rod 26 extending from the upper and lower support sections 18, 20 is configured to have sufficient length for the blades to fold along said part of the rod 26.

It is noted that in transient wing-borne flight modes, i.e. wing-borne flight modes in transition from hover flight mode to wing-borne flight mode or vice versa, all four propellers 10*b*, 12*b*, 22*b* and 24*b* may be operated. However, in stable wing-borne flight mode, the total thrust required is produced by the propellers 10*b*, 12*b* by virtue of the relatively small length and relatively high pitch angle.

Figure 7:
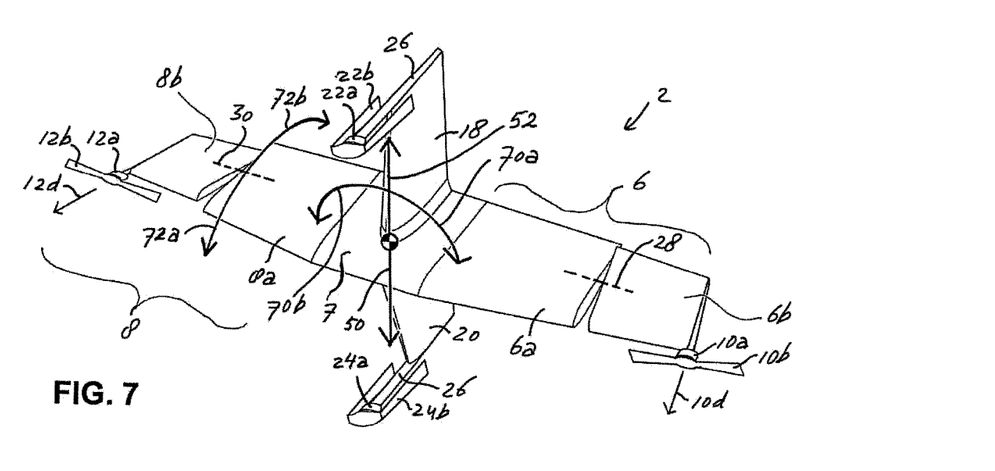
FIG. 7 depicts a variant of the perspective view of FIG. 5 to illustrate roll and pitch control in wing-borne flight mode.

As illustrated in FIG. 7, roll and pitch control of the aircraft 2 in wing-borne flight mode, i.e. control of aircraft movement in one of the directions 70*a* and 70*b* as indicated by a double arrow (roll control), and in one of the directions 72*a* and 72*b* as indicated by a double arrow (pitch control), can be performed by rotating the left wingtip section 6*b* relative to the left wing base section 6*a* across a desired angle (relative to the neutral position as illustrated in FIG. 5) about axis 28 and/or rotating the right wingtip section 8*b* relative to the right wing base section 8*a* across a desired angle (relative to the neutral position as illustrated in FIG. 5) about axis 30.

For roll control, with the left wingtip section 6*b* at an angle to left wing base section 6*a*, the right wingtip section 8*b* can be rotated relative to the right wing base section 8*a* across an angle (relative to the neutral angular position as illustrated in FIG. 5) about axis 30 in opposite direction to the left wingtip section angle to generate a moment of roll in the same direction. In the situation as illustrated in FIG. 7, the moment of roll will be in direction of arrow 70*a*.

It is noted that a similar moment of roll would be generated when only one of the left wingtip section 6*b* and right wingtip section 8*b* would be rotated relative to the corresponding wing base section, and the other one of the left wingtip section 6*b* and right wingtip section 8*b* would be in its neutral position.

For pitch control, with the left wingtip section 6*b* at an angle to left wing base section 6*a* about axis 28, the right wingtip section 8*b* is rotated relative to the right wing base section 8*a* across an angle (relative to the neutral angular position as illustrated in FIG. 5) about axis 30, preferably the same angle, in the same direction as the left wingtip section angle to generate a moment of pitch. In the situation as illustrated in FIG. 7, when both wingtip sections 6*b*, 8*b* would have their trailing edge rotated up (cf. left wingtip section 6*b*), the moment of pitch would be in the direction of arrow 72*b*, while the moment of pitch would be in the direction of arrow 72*a* when the trailing edges of both wingtip sections 6*b*, 8*b* would be rotated down.

It is further noted that yaw control of the aircraft 2 in wing-borne flight mode can be induced by differential thrust wherein propeller 10*b* produces a thrust different from propeller 12*b*.

Figures 8, 9:
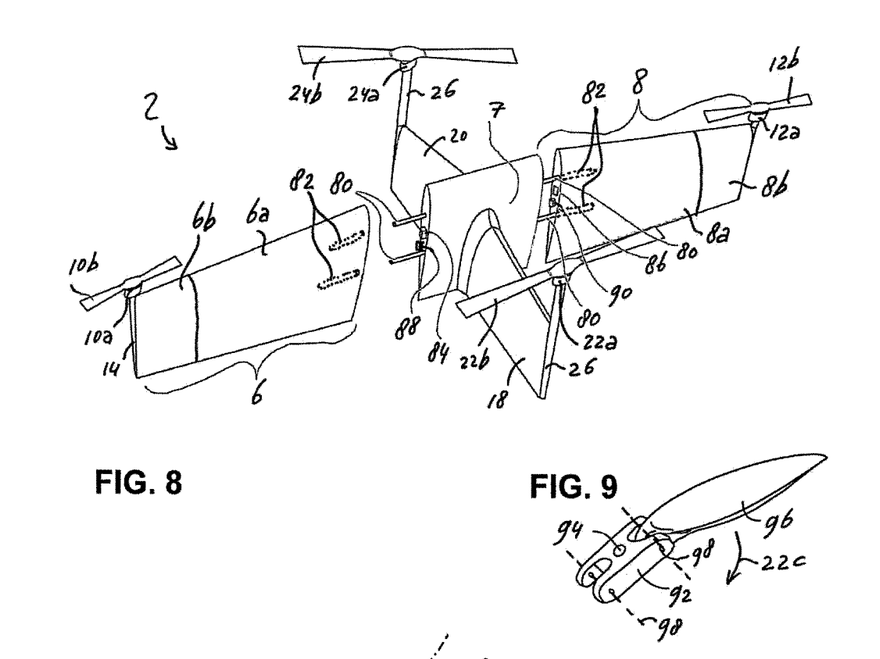
FIG. 8 illustrates, in a perspective view corresponding to FIG. 4, detachable coupling of wing sections of the wing structure of the aircraft of the present invention.
FIG. 9 depicts details, in perspective view, of a support structure thrust unit propeller blade support allowing the collapsing of the blade.

FIG. 8 illustrates how left wing section 6 and right wing section 8 are detachably connected to middle wing section 7 through a coupling.

A first component of the coupling comprises two pairs of rods 80 extending from the middle wing section 7 in a lengthwise direction of the wing structure 4 in opposite directions. Each rod 80 preferably has a circular cross-section being the same along the length of the rod 80, although other cross-sections are possible, and variations of dimensions along the length of the rod 80 are possible. A first pair of rods 80 extending from the middle wing section 7 to the left wing section 6 is configured to engage a pair of holes 82 in the left wing section 6, more in particular in the left wing base section 6*a*. A second pair of rods 80 extending from the middle wing section 7 to the right wing section 8 is configured to engage a pair of holes 82 in the right wing section 8, more in particular in the right wing base section 8*a*. When the rods 80 and holes 82 are coupled, the left wing section 6 and the right wing section 8 can only be moved away from the middle wing section 7 along the lengthwise direction of the rods 80. The rods 80 prevent any movement perpendicular to the lengthwise direction of the rods 80, as well as bending of the left and right wing sections 6, 8 relative to the middle wing section 7. Preferably, the dimensions of the rods 80 and the holes 82 are adapted to each other to provide a close fit.

The rods 80 may be configured to break upon exertion of a bending stress exceeding a predetermined value, to allow a left wing section 6 and/or right wing section 8 to detach from the middle wing section 7 in case of a crash or other event provoking an excessive bending stress on the rods 80. For this purpose, the rod 80 may be provided with a weakened section, such as a section having a reduced cross-section. The weakened section may be provided at a location on the rod 80 which, in use, is located at or near the interface between the middle wing section 7 and the left wing section 6 or the right wing section 8.

Instead of two rods 80 cooperating with two holes 82 per wing section, another number of rods 80 and corresponding holes 82 may be used.

A second component of the coupling comprises a magnetic coupling having two parts exerting a attracting force on each other wherein, in an interface between the middle wing section 7 and the left wing section 6, wherein one part 84 is mounted on the middle wing section 7, and the other part 86 is mounted on the left wing section 6, in particular on the left wing base section 6*a*, more particular at a side of the left wing base section 6*a* facing the middle wing section 7. Similarly, in an interface between the middle wing section 7 and the right wing section 8, one part 84 is mounted on the middle wing section 7, and the other part 86 is mounted on the right wing section 8, in particular on the right wing base section 8*a*, more particular at a side of the right wing base section 8*a* facing the middle wing section 7.

One of the two parts 84, 86 of the magnetic coupling may comprise a permanent magnet, whereas the other one of the two parts 84, 86 of the magnetic coupling may comprise a permanent magnet or a member made of a magnetizable material. When both parts 84, 86 comprise permanent magnets, their respective magnetic polarization or polarization pattern is such that the permanent magnets attract each other.

It is noted here that instead of, or in addition to the magnetic coupling, also coupling through a mechanical latching or locking device may be applied.

The magnetic couplings prevent, up to a limit determined by the attracting force between the parts 84, 86 thereof, that the left and right wing sections 6, 8 become detached from the middle wing section 7 under normal flight conditions to be expected.

A third component of the coupling comprises a connector configured for electrically (including capacitively and inductively) and/or optically and/or pneumatically and/or hydraulically connecting components in the respective left and right wing sections 6, 8, and the middle wing section 7. The connector has two parts in an interface between the middle wing section 7 and the left wing section 6, wherein one connector part 88 is mounted on the middle wing section 7, and the other connector part 90 is mounted on the left wing section 6, in particular on the left wing base section 6*a*, more in particular at a side of the left wing base section 6*a* facing the middle wing section 7. Similarly, in an interface between the middle wing section 7 and the right wing section 8, one connector part 88 is mounted on the middle wing section 7, and the other connector part 90 is mounted on the right win section 8, in particular on the right wing base section 8a, more in particular at a side of the right wing base section 8a facing the middle wing section 7.

One of the connector parts 88 and 90 may be a male connector part, and the other one of the connector parts 88 and 90 may be a female connector part. Alternatively, the connector parts 88, 90 may be hermaphroditic.

Under crash conditions, the rods 80 may break at or near the interface between one or both of the left and right wing sections 6, 8 and the middle wing section 7, whereby also one or both of the magnetic couplings, and one or both of the connectors may become detached.

In this way, part of the crash energy may be absorbed in these elements, and crash forces exerted on components of the aircraft 2 are diminished.

For compact transport of the aircraft when out of use, the parts 84 and 86 of the respective magnetic coupling, and the connector parts 88 and 90 may be detached from each other by exerting a tension force on the left and right wing sections 6 and 8 away from the middle wing section 7, substantially parallel to the lengthwise direction of the rods 80. Accordingly, the left and right wing sections 6 and 8 including the thrust units 10 and 12, respectively, may be removed from the remainder of the aircraft.

Figure 10:
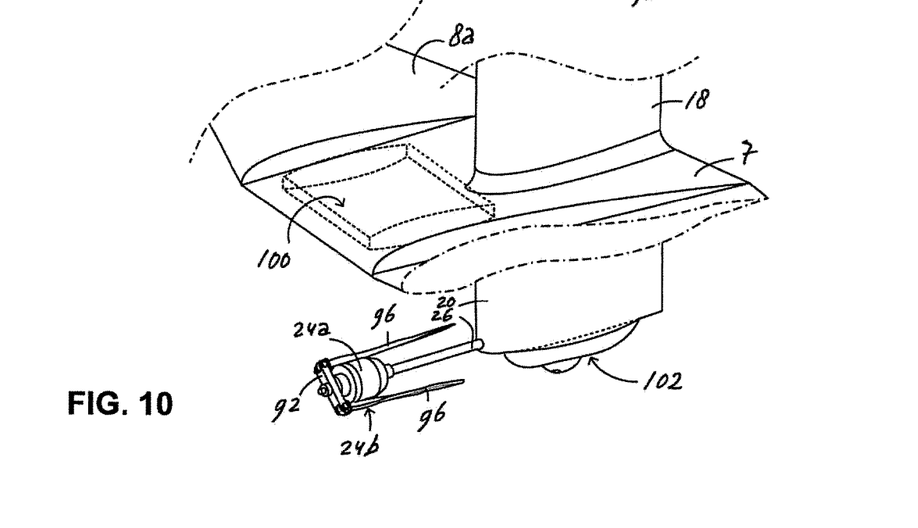
FIG. 10 illustrates, in perspective view, further details of an embodiment of the aircraft of the present invention.

FIGS. 9 and 10 provide further details of the collapsible propellers 22b, 24b. A hub support 92, which may be generally H-shaped, has a central hole 94 which allows mounting of the hub support 92 on a shaft of a motor 22a, 24a to be fixedly connected to the shaft. Each one of the propellers 22b, 24b comprises two blades 96, only one of which is shown in FIG. 9. The blades 96 are hingeably connected to the hub support 92 such that each blade 96 is rotatable around an axis indicated by dashed line 98.

Assuming that the blade 96 shown in FIG. 9 is part of propeller 22b, upon rotation of the hub support 92 in direction of rotation 22c by the motor 22a connected thereto, the blades 96 extend from the position shown in FIGS. 5, 7 and 10 to rotate in a plane generally perpendicular to the axis of rotation of the hub support 92 as shown in FIGS. 1-4, 6 and 8. The hub support 92 may comprise at least one stop member to ensure that the angular position of the blades 96 relative to the hub support 92 is limited to the indicated range (between being folded away according to FIGS. 5, 7 and 10, and being radially extended according to FIGS. 1-4, 6 and 8).

FIG. 10 further indicates a use of the middle wing section 7 to accommodate a power supply and control unit 100 as indicated by dashed lines. The power supply and control unit 100 may be configured to supply power to the motors 10a, 12a, 22a and 24a, to the actuators in the left and right wing sections 6, 8 and to equipment carried by the aircraft 2.

The power supply and control unit 100 may be, or may comprise, the central supply and control unit 34 according to FIG. 3.

Equipment 102, such as remote sensing equipment and/or measuring equipment and/or camera equipment, may be carried by the aircraft 2 on upper support section 18 and/or lower support section 20.

FIGS. 12 to 17 schematically illustrate the aircraft 2, in particular in top view, provided with various systems of energy storage and power distribution.

Figure 12:
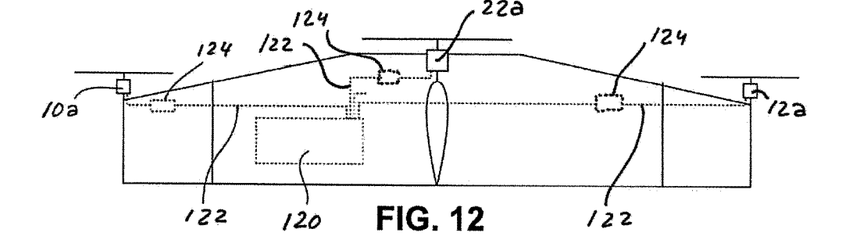
FIGS. 12 to 17 depict schematic top views of embodiments of an aircraft of the present invention, indicating various systems of energy storage and power distribution.

Referring to FIG. 12, electrical energy is chemically stored in a power source embodied as a battery 120 provided at a suitable location in the wing structure 4 and/or support structure 16 of the aircraft 2. Electrical power can be supplied from the battery 120 to the motors 10a, 12a, 22a and 24a (not shown) by means of electrically conductive wires 122. Herein, electrically conductive wires are deemed to also cover busbars and other conductors of electric current. A motor control unit 124 may be included in the electrical connection between the battery 120 and each one of the motors 10a, 12a, 22a and 24a, to control power supplied to the motors 10a, 12a, 22a and 24a. Instead of multiple control units 124 for multiple motors 10a, 12a, 22a, 24a, it is also possible to use one control unit 124 controlling energy supply to each of the motors 10a, 12a, 22a, 24a. An advantage of the use of one battery 120 is the simple structure of the energy storage and power distribution system, in particular when only one control unit 124 is used.

Figure 13:
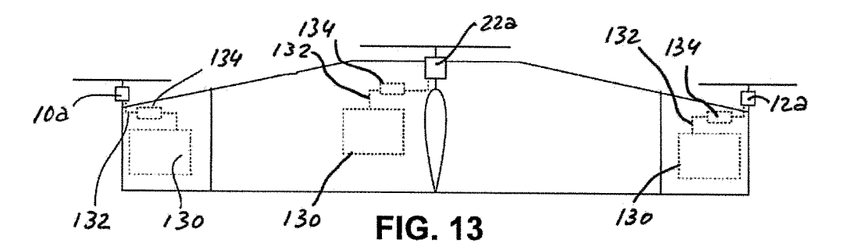

Referring to FIG. 13, electrical energy is chemically stored in power sources embodied as batteries 130 provided at suitable locations in the wing structure 4 and/or support structure 16 of the aircraft 2. Electrical power can be supplied from each battery 130 to a corresponding motor 10a, 12a, 22a and 24a (not shown) by means of electrically conductive wires 132. A motor control unit 134 may be included in the electrical connection between each battery 130 and the corresponding motor 10a, 12a, 22a and 24a, to control power supplied to each motor 10a, 12a, 22a and 24a. An advantage of the use of multiple batteries 130 is the improvement of the reliability of the energy storage system, since a failure in one battery 130 need not have an impact on the other batteries 130. Another advantage of the use of multiple batteries 130 may be an improvement of the total efficiency of the energy storage system, by selecting optimum respective battery characteristics for each specific thrust unit 10, 12, 22, 24.

Figure 14:
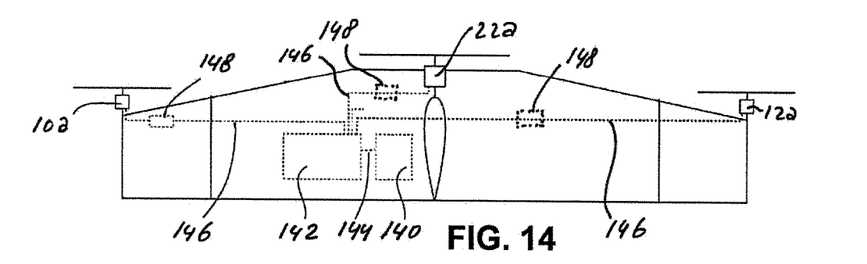

Referring to FIG. 14, a chemical storage of energy is illustrated, by means of a fuel stored in a tank 140 provided at a suitable location in the wing structure 4 and/or support structure 16 of the aircraft 2. The fuel (with an oxidizer) is to be converted to electrical energy directly by supplying it to a fuel cell 142 through a conduit 144. The fuel cell 142, provided at a suitable location in the wing structure 4 and/or support structure 16 of the aircraft 2, produces electrical power that can be supplied from the fuel cell 142 to the motors 10a, 12a, 22a and 24a (not shown) by means of electrically conductive wires 146. A motor control unit 148 may be included in the electrical connection between the fuel cell 142 and each one of the motors 10a, 12a, 22a and 24a, to control power supplied to the motors 10a, 12a, 22a and 24a. Instead of multiple control units 148 for multiple motors 10a, 12a, 22a, 24a, it is also possible to use one control unit 148 controlling energy supply to each of the motors 10a, 12a, 22a, 24a. An advantage of the use of one fuel cell 142 is the simple structure of the energy storage and power distribution system, in particular when only one control unit 148 is used.

Figure 15:
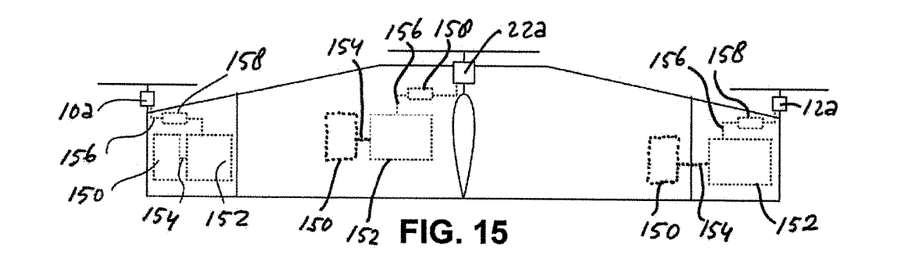

Referring to FIG. 15, energy is chemically stored in fuel tanks 150 provided at suitable locations in the wing structure 4 and/or support structure 16 of the aircraft 2. Power sources embodied as fuel cells 152 are also provided at suitable locations in the wing structure 4 and/or support structure 16 of the aircraft 2. Fuel from the fuel tanks 150 is supplied to corresponding fuel cells 152 through corresponding conduits 154. Electrical power can be supplied from each fuel cell 152 to a corresponding motor 10a, 12a, 22a and 24a (not shown) by means of electrically conductive wires 156. A motor control unit 158 may be included in the electrical connection between each fuel cell 152 and the corresponding motor 10a, 12a, 22a and 24a, to control power supplied to each motor 10a, 12a, 22a and 24a. An advantage of the use of multiple fuel cells 152 is the improvement of the reliability of the energy storage system, since a failure in one fuel cell 152 need not have an impact on the other fuel cells 152. Another advantage of the use of fuel cells 152 may be an improvement of the total efficiency of the energy storage system, by selecting optimum respective fuel cell characteristics for each specific thrust unit 10, 12, 22, 24.

Figure 16:
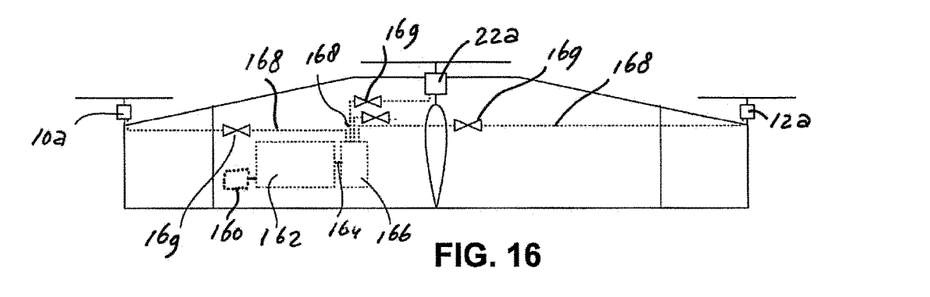

Referring to FIG. 16, energy is stored in an energy storage 160. In case of storage of electrical energy, the energy storage 160 may be embodied as a battery. In case of storage of chemical energy, the energy storage 160 may be embodied as a fuel tank containing a fuel. Energy storage 160 is provided at a suitable location in the wing structure 4 and/or support structure 16 of the aircraft 2. Energy is supplied to a mechanical power source 162, which may be embodied as an electric engine or a combustion engine. The power source 162 is provided at a suitable location in the wing structure 4 and/or support structure 16 of the aircraft 2. The power source 162 has an output shaft 164 driving a power conversion unit 166, such as a pneumatic compressor, or a hydraulic pump. The power conversion unit 166 is provided at a suitable location in the wing structure 4 and/or support structure 16 of the aircraft 2. Power is supplied from the power conversion unit 166 to the motors 10a, 12a, 22a and 24a (not shown) by means of pneumatic or hydraulic lines 168. Valves 169, flow regulators and/or pressure regulators 169 may be included between the power conversion unit 166 and the motors 10a, 12a, 22a and 24a. In this embodiment, the motors 10a, 12a, 22a and 24a are of a pneumatic or hydraulic type.

Figure 17:
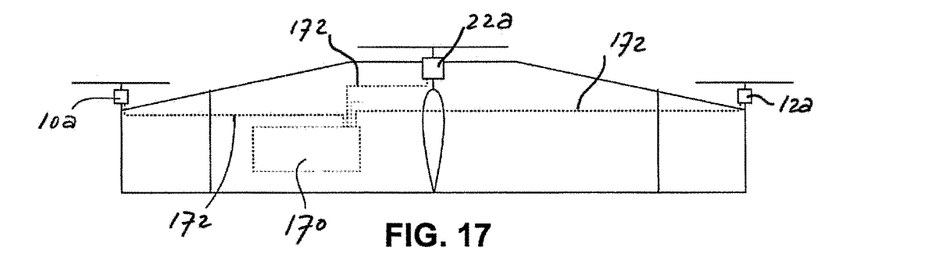

Referring to FIG. 17, a chemical storage of energy is illustrated, by means of a fuel stored in a tank 170 provided at a suitable location in the wing structure 4 and/or support structure 16 of the aircraft 2. The fuel (adding an oxidizer) can be supplied to the motors 10a, 12a, 22a and 24a (not shown) being combustion motors, through fuel supply lines 172. The motors 10a, 12a, 22a and 24a combust the fuel to generate mechanical power to drive the corresponding propellers.

It is noted that the propellers of the thrust units may have two blades, as shown in the Figures, but in other embodiments within the scope of the present invention may have a larger number of blades.

It is further noted that the support structure of the aircraft may comprise more than two support sections with associated thrust units, i.e., more support sections than the upper support section 18 and lower support section 20 with respective thrust units as shown in the Figures. For example, the support structure may have two or more upper support sections, and/or two or more lower support sections, each carrying a thrust unit. The plurality of upper support sections, as well as the plurality of lower support sections, are preferably symmetrically arranged relative to the longitudinal axis of the aircraft. An advantage of a plurality of upper and lower support sections with associated thrust units is that in hover flight mode a high upwardly directed thrust can be developed, allowing the aircraft, including its payload, to have a higher weight, or providing a redundancy in thrust units in critical missions to keep the aircraft in the air even if one or more thrust units have a defect.

As explained above, an aircraft, in particular an unmanned aerial vehicle, comprises a wing structure having a left wing section, a middle wing section, and a right wing section. A support structure extends from the wing structure, e.g. from the middle wing section, and has an upper support section and a lower support section. Each one of the left wing section, the right wing section, the upper support section and the lower support section is provided with a thrust unit. The left wing section comprises a left wing base section and a left wingtip section, wherein the left wingtip section is rotatable relative to the left wing base section around an axis extending substantially in a lengthwise direction of the wing structure. The right wing section comprises a right wing base section and a right wingtip section, wherein the right wingtip section is rotatable relative to the right wing base section around an axis extending substantially in the lengthwise direction of the wing structure. The thrust units of the left and right wing sections are provided at the respective wingtip sections, in particular at the extremities thereof.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a"/"an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly.

The invention claimed is:

1. An aircraft, wherein the aircraft is an unmanned aerial vehicle with a wing-borne flight mode and a hover flight mode, the aircraft comprising:
   a wing structure having a lengthwise direction, and having a left wing section and a right wing section; and
   a support structure extending from the wing structure, and having an upper support section and a lower support section,
   wherein each one of the left wing section, the right wing section, the upper support section and the lower support section is provided with a thrust unit,
   wherein, in the wing structure:
      the left wing section comprises a left wing base section and a left wingtip section, wherein the left wingtip section is rotatable relative to the left wing base section around an axis extending substantially in the lengthwise direction of the wing structure;
      the right wing section comprises a right wing base section and a right wingtip section, wherein the right wingtip section is rotatable relative to the right wing base section around an axis extending substantially in the lengthwise direction of the wing structure; and
      the thrust unit of the left wing section is provided at the left wingtip section and is rotatable together with said left wing tip section, and the thrust unit of the right wing section is provided at the right wingtip section and is rotatable together with said right wing tip section,
   wherein the rotatable left and right wing tip sections are configured to provide yaw control in the hover flight mode through rotation of the left and right wing tip sections relative to the respective left and right wing base sections within a positive and negative rotation angle range relative to a neutral angular position, wherein, in the hover flight mode, the wing structure is tilted around an axis that extends through the thrust unit of the left wing tip section and the thrust unit of the right wing tip section with respect to the wing-borne flight mode.

2. The aircraft according to claim 1, wherein the thrust unit of the left wing section is provided at an extremity of the left wingtip section, and wherein the thrust unit of the right wing section is provided at an extremity of the right wingtip section.

3. The aircraft according to claim 1, wherein the left and right wingtip sections are rotatable relative to the respective left and right wing base sections within a rotation angle range of +50° to −50°.

4. The aircraft according to claim 1, wherein a length of the left and right wingtip sections is smaller than 60% of the length of the respective left and right wing section, and larger than a length of the propeller blade.

5. The aircraft according to claim 1, wherein the thrust units of the respective upper and lower support sections are provided on an extremity of said respective upper and lower support sections.

6. The aircraft according to claim 1, wherein the thrust units of the respective upper and lower support sections each are mounted on a support extending from the respective upper and lower support sections at the extremities of said respective upper and lower support sections.

7. The aircraft according to claim 1, wherein each thrust unit comprises a propeller coupled to an electric motor.

8. The aircraft according to claim 7, wherein the propellers of the thrust units of the upper and lower support sections are collapsible.

9. The aircraft according to claim 7, wherein blades of the propellers of the thrust units of the upper and lower support sections are longer than blades of the propellers of the thrust units of the left and right wing sections.

10. The aircraft according to claim 7, wherein a pitch angle of the propellers of the thrust units of the upper and lower support sections is smaller than a pitch angle of the propellers of the thrust units of the left and right wing sections.

11. The aircraft according to claim 7, wherein pairs of propellers of the thrust units of the left and right wing sections are configured to rotate in opposite directions.

12. The aircraft according to claim 1, wherein each one of the left and right wing sections is detachably coupled to a middle wing section by a coupling.

13. The aircraft according to claim 12, wherein the coupling comprises at least one rod in one part of the coupling configured to engage a corresponding hole in another part of the coupling.

14. The aircraft according to claim 13, wherein the rod is configured to break when a predetermined bending stress exerted on said rod is exceeded.

15. The aircraft according to claim 12, wherein the coupling comprises at least one of an electrical connector, an optical connector, a pneumatic connector, and a hydraulic connector.

16. The aircraft according to claim 12, wherein the coupling comprises a magnetic coupling.

17. The aircraft according to claim 3, wherein said rotation angle range is from +30° to −30°.

18. The aircraft according to claim 3, wherein said rotation angle range is from +25° to −25°.

19. The aircraft according to claim 7, wherein pairs of propellers of the thrust units of the support structure are configured to rotate in opposite directions.

20. The aircraft according to claim 1, wherein the rotation angles of the rotatable left and right wing tip sections relative to the respective left and right wing base sections have an absolute value of less than 50 degrees under all flight conditions.

21. The aircraft according to claim 1, wherein the left wing base section and the right wing base section are static relative to the aircraft.

22. The aircraft according to claim 1, wherein the rotatable left and right wing tip sections are configured to provide roll control in the wing-borne flight mode.

23. The aircraft according to claim 1, wherein the rotatable left and right wing tip sections are configured to provide pitch control in the wing-borne flight mode.

24. An aircraft wherein the aircraft is an unmanned aerial vehicle with a wing-borne flight mode and a hover flight mode, the aircraft comprising:

a wing structure having a lengthwise direction, and having a left wing section and a right wing section; and a support structure extending from the wing structure, and having an upper support section and a lower support section, wherein each one of the left wing section, the right wing section, the upper support section and the lower support section is provided with a thrust unit, wherein, in the wing structure:

the left wing section comprises a left wing base section and a left wingtip section, wherein the left wingtip section is rotatable relative to the left wing base section around an axis extending substantially in the lengthwise direction of the wing structure;

the right wing section comprises a right wing base section and a right wingtip section, wherein the right wingtip section is rotatable relative to the right wing base section around an axis extending substantially in the lengthwise direction of the wing structure; and the thrust unit of the left wing section is provided at the left wingtip section and is rotatable together with said left wing tip section, and the thrust unit of the right wing section is provided at the right wingtip section and is rotatable together with said right wing tip section, wherein the rotatable left and right wing tip sections are configured to provide yaw control in the hover flight mode and/or roll control in the wing-borne flight mode and/or pitch control in the wing-borne flight mode through rotation of the left and right wing tip sections relative to the respective left and right wing base sections within a positive and negative rotation angle range relative to a neutral angular position, wherein, in the hover flight mode, the wing structure is tilted around an axis that extends through the thrust unit of the left wing tip section and the thrust unit of the right wing tip section with respect to the wing-borne flight mode.

* * * * *